United States Patent [19]
Grombka

[11] 3,889,515
[45] June 17, 1975

[54] WEDGING STRUCTURE FOR PRESSES OR THE LIKE

[75] Inventor: Walter J. Grombka, Tiffin, Ohio

[73] Assignee: The National Machinery Company, Tiffin, Ohio

[22] Filed: July 22, 1974

[21] Appl. No.: 490,270

[52] U.S. Cl. .................... 72/448; 100/53; 100/257
[51] Int. Cl. .......................................... B21j 13/02
[58] Field of Search ........ 72/448, 446, 452; 100/52, 100/257; 308/DIG. 1

[56] References Cited
UNITED STATES PATENTS

| | | | |
|---|---|---|---|
| 1,716,414 | 6/1929 | Beyer | 100/257 |
| 2,245,573 | 6/1941 | Criley | 72/448 |
| 2,730,760 | 1/1956 | Bibby | 100/257 |
| 2,826,947 | 3/1958 | Creek | 72/448 |
| 3,277,696 | 10/1966 | Gertel | 73/71.6 |
| 3,583,201 | 6/1971 | Topaz | 100/53 |
| 3,584,497 | 6/1971 | Pohjois | 72/448 |

FOREIGN PATENTS OR APPLICATIONS 151,348  5/1953  Australia............................ 100/257

OTHER PUBLICATIONS
SKF Engineering Data, SKF Industries, Inc., Philadelphia, Pa. 19132. Pages 102-104 (copyright 1968).

The Torrington Co., South Bend, Indiana 46621, Catalog 1268, Page 159 (Copyright 1967).

*Primary Examiner*—C. W. Lanham
*Assistant Examiner*—Gene P. Crosby
*Attorney, Agent, or Firm*—McNenny, Farrington, Pearne & Gordon

[57] ABSTRACT

A wedge system disclosed for adjustably positioned tools in a forging press or the like. The system includes a wedge positioned between two assemblies and provided with a locking taper. Hydraulic means permit a lubricant to be supplied under pressure to the surfaces of the wedge so that the wedge is released and can float laterally even when large loads are applied to the system as for example during a tooling jam. The system totally encloses the wedge chamber preventing scale or other contaminants from rusting, pitting, or scarring the wedge surface. Hydraulic means are provided to lock the wedge in an adjusted position and power means are provided to move the wedge for adjustment.

17 Claims, 6 Drawing Figures

WEDGING STRUCTURE FOR PRESSES OR THE LIKE

BACKGROUND OF THE INVENTION

This invention relates generally to forging presses or the like and more particularly to a novel and improved bed frame die support wedge system and a press incorporating such system.

PRIOR ART

It is customary to provide a wedge system to adjustably support dies on the bed frame of forging machines or the like. The U.S. Pat. Nos. 1,709,876; 2,017,784; 2,199,864; 2,245,573; 2,826,947; 3,422,660; 3,422,661; 3,427,855; and 3,584,497, all disclose various structures of such type.

Difficulty is sometimes encountered with the prior art wedge systems when the slide jams or becomes stalled in its dead center position with the tools and dies engaging. In many instances, it has been necessary to burn out or cut away the dies or their support to free the slide for retraction.

In order to overcome this problem, the wedges are sometimes provided with relatively steep wedge angles so that they can be driven back to release the pressure on the tools. Such solution, however, can cause the wedges to be unstable during normal operation of the machine to the extent that secondary wedges are sometimes used to lock the primary wedge in position. The U.S. Pat. No. 2,175,742 disclosed such a system.

Further, the solution of providing steep wedge angles does not always produce the desired result since the wedges are generally exposed to scale and other contaminants which result in rusting, pitting and scarring of the wedge surfaces with the result that the sliding characteristics of the wedge change during the use of the machine and wedges, even when formed with relatively steep angles, can jam or lock in a given position.

SUMMARY OF THE INVENTION

In accordance with the present invention, a wedge system is provided for forging presses or other types of presses in which the wedge is formed with relatively small wedge angle, in the order of 4°. Such wedge is self-locking and it is not necessary to provide heavy load supporting wedge blocking devices to maintain the wedge in its adjusted position. The system is provided with closure means which prevent scale or other contaminants from reaching the wedge faces. Consequently, the wedge surfaces do not deteriorate during use.

A hydraulic system is provided to introduce lubricant under pressure between the surfaces of the wedge so that the wedge can float laterally and release the press slide in the event the slide becomes jammed or stalled in its center position. The effective area of the lubricant is sufficiently great to permit the floating of the wedge even when the extremely large forces encountered in a jam are applied to the wedge system. With this invention, the slide is released without difficulty and it is not necessary to damage or destroy either the tooling or its support structure to release the jam.

In the preferred embodiment of this invention, power means are also provided to permit easy adjustment of the wedge system during the tooling setup and powered lock means operate to maintain the system in its adjusted position during normal operation of the press.

DETAILED DESCRIPTION OF THE DRAWINGS

Figure 1:
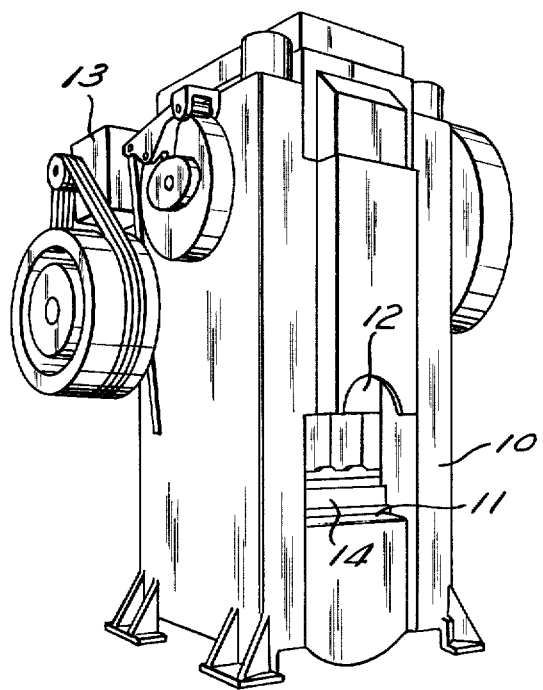
FIG. 1 is a perspective view of a typical forging press of the general type to which the present invention is particularly suited.

FIG. 1 illustrates a typical vertical forging press having a frame 10 providing a die bed 11, and a slide 12 reciprocable toward and away from the breast 11. The slide is powered by a motor 13 and is driven by a crank and pinion type drive linkage. Positioned on the die bed 11 is a die support wedge system 14 incorporating the present invention. This wedge system 14 adjustably positions the fixed dies in the frame 10 of the machine. The wedge system is adjustable to raise and lower the fixed dies so that they are properly positioned with respect to the movable dies or tools carried by the slide.

Figure 3:
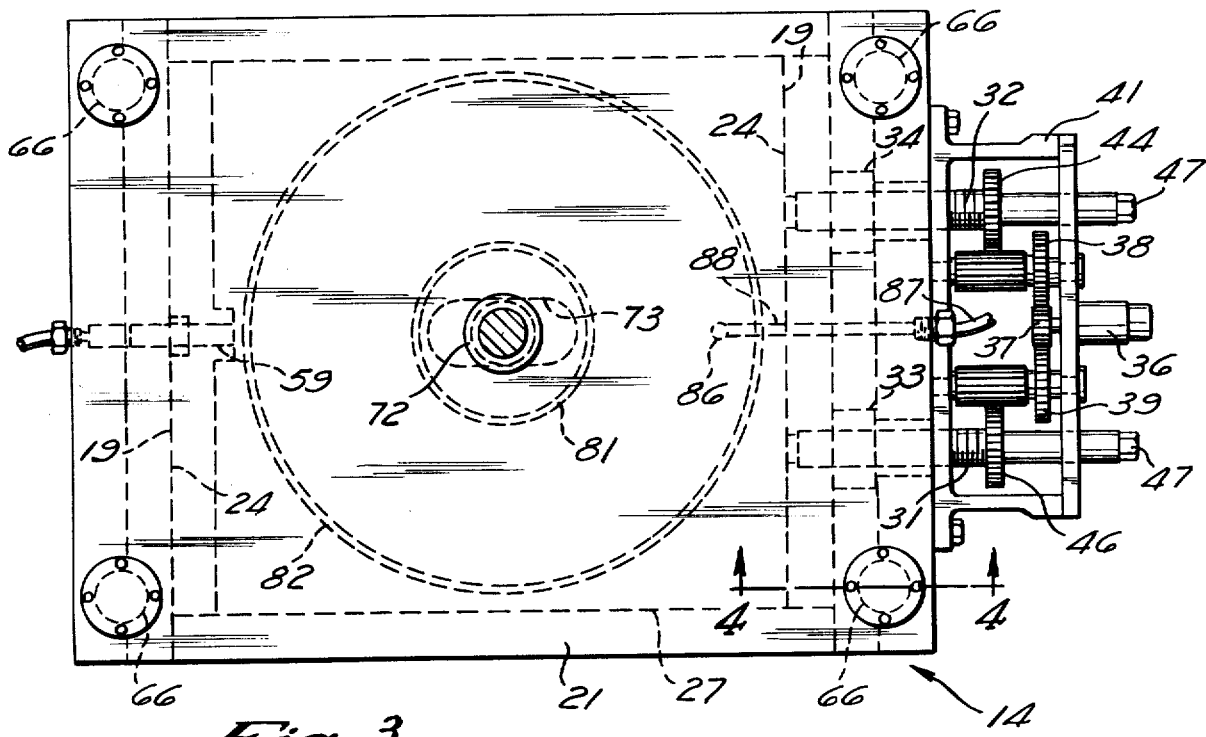
FIG. 3 is a plan view of the wedge system illustrated in FIG. 2.
Figure 2:
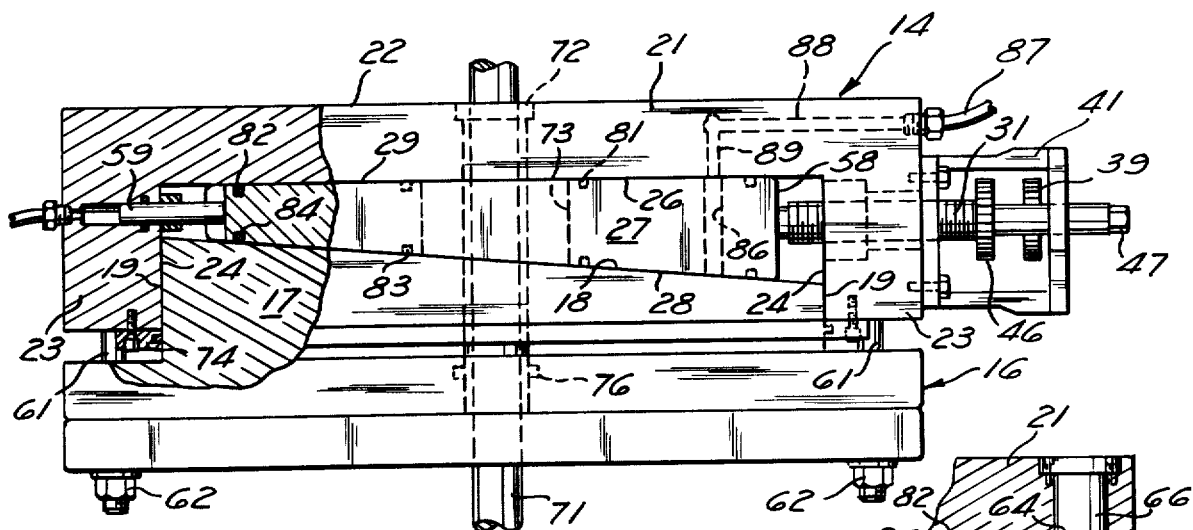
FIG. 2 is a side elevation partially in section of a wedge support system incorporating the present invention.

Referring to FIGS. 2 and 3, the die support wedge system 14 includes a base plate assembly 16 which is secured to the die bed 11 of the machine. The base plate assembly includes an upwardly projecting generally rectangular, integral wedge portion 17 provided with an inclined upper wedge surface 18, and sidewalls 19.

Positioned above the base plate assembly 16 is a cover plate 21 having an upper surface 22, which supports a die set or bolster. The cover plate 21 is formed with depending walls 23 having inner surfaces 24 proportioned to closely fit the sidewalls 19 to prevent lateral movement between the base plate assembly 16 and the cover plate 21. The mating walls, however, permit vertical movement of the cover plate with respect to the base plate.

Positioned between the wedging surface 18 and the lower horizontal surface 26 of the cover plate 21 is a wedge 27. The terms horizontal and vertical are used herein to simplify the description. However, the invention does not require such orientation and the system can be used in other orientations. The lower surface of the wedge 28 engages the wedge surface 18 and the upper surface of the wedge 29 engages the surface 26 of the cover plate 21. The two wedge surfaces, 18 and 28, are inclined at a locking angle with respect to the surfaces 26 and 29. Preferably this angle is in the order of 4°. Consequently, vertical loads applied to the cover plate 21 do not tend to produce lateral movement of the wedge 27 with respect to the two plate assemblies.

Figure 5:
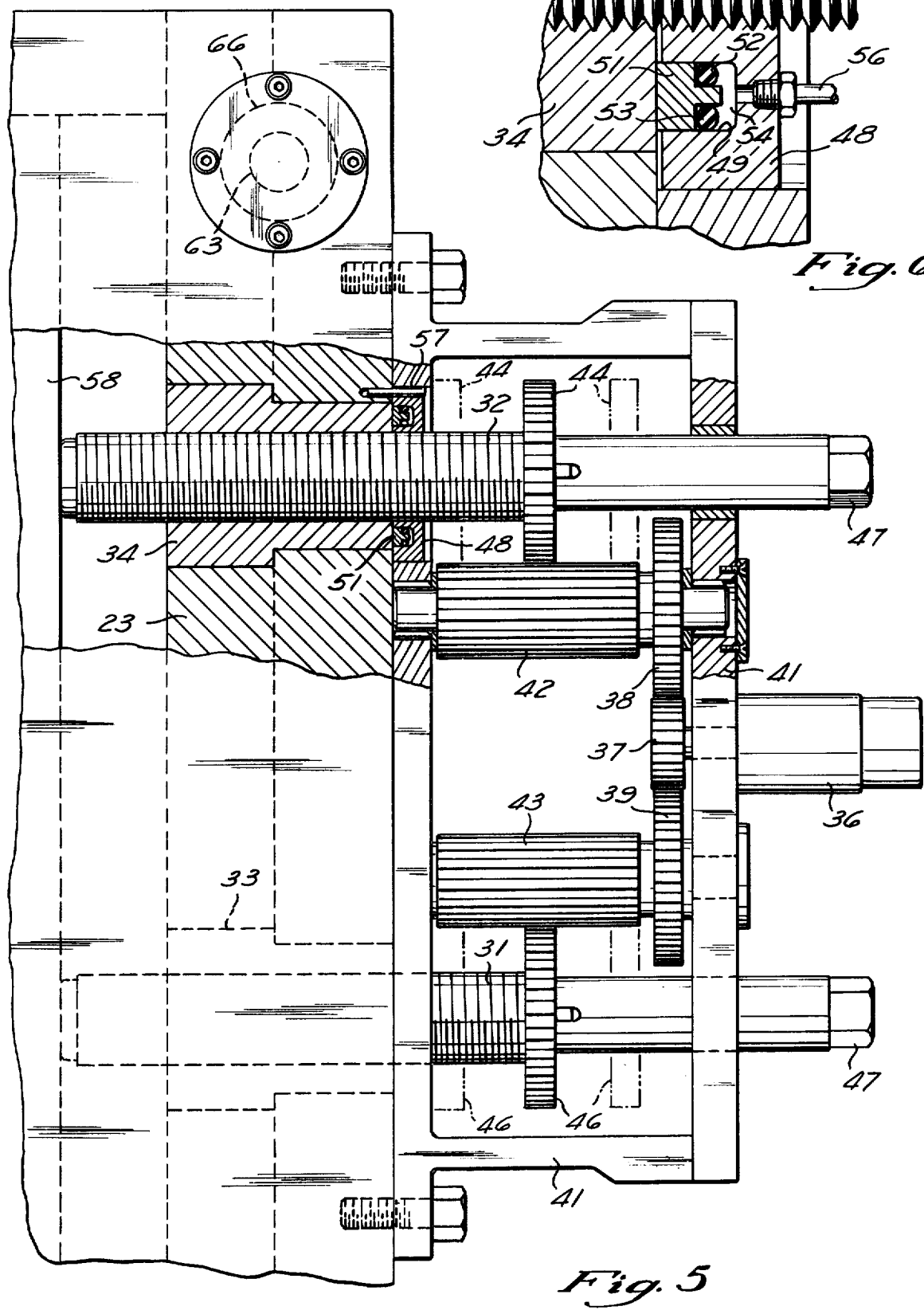
FIG. 5 is an enlarged plan view partially in section illustrating the power drive for adjusting the wedge; and, FIG. 6 is an enlarged fragmentary section of the hydraulic lock mechanism for locking the wedge adjusting screws in their adjusted positions.

The position of the wedge 27 is determined by a pair of screws 31 and 32 which are threaded through bushings 33 and 34, respectively, in the wall 23. A power drive is provided for the screws 31 and 32 which is best illustrated in FIG. 5. The drive includes a motor 36 having a drive gear 37 mounted on its output shaft. The gear 37 meshes with a pair of gears 38 and 39 which are, in turn, journaled for rotation about their axis in a frame 41. Each of the gears 38 and 39 drives an elongated gear 42 and 43 respectively, which drive gears 44 and 46 provided on the screws 32 and 31 respectively. This gearing drive provides synchronized rotation and speed reduction. The elongated gears accommodate lengthwise movement of the two screws as they are adjusted in or out as the case may be. The screws are also provided with wrenching ends 47 to permit manual operation in the event the motor becomes inoperable.

The two screws 31 and 32 extend through the sidewall 23 and engage at their inner ends with an end wall 58 of the wedge to locate the wedge 27 with respect to the two plate assemblies. When the screws are threaded outwardly, the wedge 27 is allowed to move to the right as viewed in FIGS. 2 and 3, causing the cover plate to be lowered. When the screws are threaded inwardly, the wedge 27 moves to the left and raises the cover plate 21. Because the screws 31 and 32 extend parallel to the surface 26 and are mounted on the cover plate 21, there is no vertical movement, during the wedge adjustment, between the end wall 58 in the inner ends of the screws.

A hydraulically actuated plunger 59 extends from the lefthand wall as viewed in FIG. 2, and engages the narrow end of the wedge. The plunger is pressurized to insure that the wedge 27 moves to the right as the screws are backed out to allow lowering of the cover plate 21.

Figure 6:
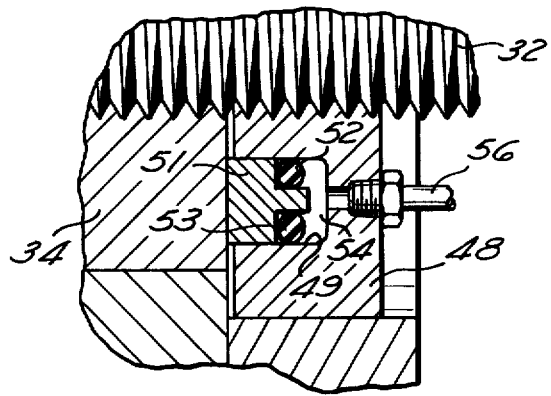

A hydraulically operated locking system is provided to releasably lock the screws in their adjusted position. This locking system includes a lock nut 48 threaded onto each of the screws 31 and 32, adjacent to the bushings 33 and 34. As best illustrated in FIG. 6, the lock nut is provided with an annular groove 49 in which an annular seal ring 51 is positioned. A pair of seals 52 and 53 provide a fluid type joint between the rings 51 and the side walls of the groove 49. When the chamber 54 is pressurized through a supply line 56, the ring 51 presses against the bushing 34 and the lock nut 48 is urged to the right as viewed in the drawing. This axial loading of the nut of course introduces friction in the system to prevent rotation of the associated screw. A pin 57 is provided to prevent rotation of the nut. During the operation of the machine, the chamber 54 is pressurized to lock the screw system in the adjusted position. Release of the pressure, of course, permits free rotation of the screws 31 and 32 for adjustment of the wedge position.

Figure 4:
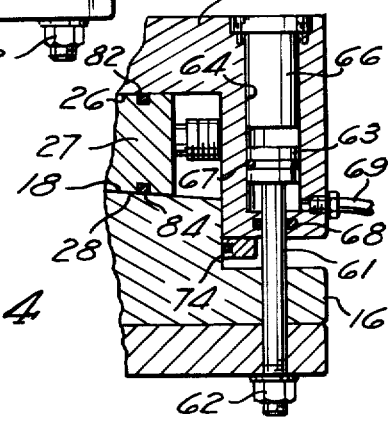
FIG. 4 is an enlarged fragmentary section taken generally along 4—4 of FIG. 3.

Located in each of the four corners of the assembly are hydraulically operated clamping devices which operate when pressurized to pull the cover plate 21 toward the base plate 16. The structure of these clamping devices is best illustrated in FIG. 4. Each clamping device includes a rod 61 threaded at its lower end to receive a nut 62 below the base plate 16. The upper end of each rod is provided with a piston head 63 positioned in a bore 64. A plug 66 is provided to close the upper end of the bore 64. A seal 67 is mounted on the piston head to provide a fluid-type joint with the wall of the bore 64 and a seal 68 in the cover plate 21 provides a seal with the rod 61. When fluid under pressure is supplied through the line 69 to the underside of the piston head 63, a reaction force is produced pulling the cover plate 21 downwardly into tight locking engagement with the wedge 27. This insures that the wedge is properly seated and also prevents the cover plate from being lifted in the event that parts being formed in the machine tend to pull upwardly with the receding tools after a working stroke.

An ejector pin 71 extends upwardly through a sleeve 72 in the center portion of the wedge system to operate the ejector devices within the various dies supported by the wedge system. The wedge is provided with an elongated clearance opening 73 to permit the adjustment movement of the wedge with respect to the sleeve without interference.

A seal ring 74 is mounted on the lower end of the wall 23 and engages the side walls 19 of the wedge projection 17 to prevent any foreign material such as scale, lubricants, coolants, or the like, from entering the wedge chamber. Similarly, a seal 76 mounted in the base plate 16 engages the outer surface of the sleeve 72 to prevent entry of foreign material in the center portion of the system. With this structure the wedge is fully enclosed and is therefore, not exposed to foreign matter which can normally reach the wedge surfaces and cause deterioration thereof. Consequently, the wedge surfaces do not deteriorate in use and it is not necessary to periodically finish the wedge surfaces.

A hydraulic system is provided to allow release of the wedge in the event that a jam occurs when the slide is in its lower dead center position. This system includes a pair of ring seals 81 and 82 positioned in the upper face 29 of the wedge and a similar pair of ring seals 83 and 84 located in grooves along the lower surface 28 of the wedge. The inner seals 81 and 83 extend around the sleeve 81 and the clearance opening 72 in the wedge. A crossport 86 extends through the wedge between the seals on the respective surfaces.

Hydraulic fluid under pressure can be admitted through a pressure line 87 and ports 88 and 89 in the cover member to the zones between the ring seals. When it is desired to free a jam, a fluid under pressure is supplied at relatively high pressure, normally in the order of 5,000 to 10,000 PSI, to the two surfaces of the wedge between the annular seals. This pressure causes the surface 28 to separate from the surface 18 and the surface 26 to separate from the surface 29. In effect, it allows the wedge to float with respect to the remaining structure, and allows the wedge to be moved to the right to release the jam by the mere expediency of threading the screws 31 back out of the cover plate. With this system the wedge becomes essentially frictionless when the surfaces are pressurized, so that it can be moved to release the jam even though extremely high forces exist in such situations. During removal of a jam, the plunger 59 can be pressurized to assist in movement of the wedge however, the force of the jam is usually sufficient to cause the wedge to release after the surfaces are pressurized.

After the jam is released, the pressure is released to return to conventional operation in which the position of the wedge is adjustably determined by the screws 31 and 32. When the wedge is properly seated, the fluid along the interface is squeezed out and the normal locking function of the wedge is re-established.

The hydraulic system for floating the wedge is not normally used during adjustment of the wedge system and it is merely necessary to release the pressure of the hold down clamps and of the lock nuts to permit the screws to be moved in or out until the desire to adjusted position is reached. During such movement, as mentioned previously, the plunger 59 is normally pressurized to insure proper seating of the wedge with the ends of the screws. After the adjusted position is reached, and during machine operation, the lock nuts 48 are pressurized to lock the screws in the adjusted position and the hold down clamps are pressurized. Because a locking taper is provided on the wedge, excessive forces are not applied to the screws during the normal operation of the machine so it is not necessary to utilize compound wedge structures or the like.

Although a preferred embodiment of this invention is illustrated it is to be understood that various modifications and rearrangements may be resorted to without departing from the scope of the invention disclosed and claimed.

What is claimed is:

1. A press or the like comprising a frame providing a die bed, a slide reciprocable in said frame toward and away from said die bed, and a wedge system on said die bed operable to adjustably position stationary dies in said press, said wedge system including a laterally movable wedge formed with a locking taper, and hydraulic means operable to supply a liquid under pressure to the interface between said wedge and the mating surfaces of said wedge system with sufficient pressure to release said wedge for lateral movement even when said slide is jammed in a dead center position.

2. A wedge system for presses or the like comprising first and second plate assemblies connected for movement in a first direction toward and away from each other, an inclined surface on one of said assemblies facing the other assembly, a wedge positioned between said inclined surface and said other assembly movable in a second direction substantially perpendicular to said first direction to permit movement of said assemblies in said one direction and to maintain them in adjusted positions, said wedge being formed with a locking taper whereby forces applied to said assemblies in said first direction do not cause movement of said wedge in said second direction, and hydraulic means to supply fluid under pressure along the operating surfaces of said wedge to permit movement thereof in said second direction even when substantial forces are applied to said assemblies.

3. A wedge system for presses or the like as set forth in claim 2 wherein said assemblies cooperate to enclose said wedge and prevent foreign matter from reaching said wedge.

4. A wedge system for presses or the like as set forth in claim 2 wherein said wedge is formed with a taper of about 4°.

5. A wedge system for presses or the like as set forth in claim 2 wherein releasable means are provided to apply forces urging said assemblies toward each other and loading the surfaces of said wedge.

6. A wedge system for presses or the like as set forth in claim 5 wherein positioning means are provided to engage and adjustably position said wedge within said assemblies.

7. A wedge system for presses or the like as set forth in claim 6 wherein said positioning means includes a pair of parallel screws threaded into said other assembly, and a gear drive connecting said screws for synchronized rotation.

8. A wedge system for presses or the like as set forth in claim 7 wherein power means are provided to urge said wedge toward said screws.

9. A wedge system for presses or the like as set forth in claim 6 wherein said positioning means include a screw threaded into said other assembly.

10. A wedge system for presses or the like as set forth in claim 9 wherein said releasable means operate to releasably lock said screw against rotation.

11. A wedge system for presses or the like as set forth in claim 10 wherein said releasable means are operated by hydraulic pressure.

12. A wedge system for presses or the like as set forth in claim 11 wherein seal means are provided between said operating surfaces of said wedge and the mating surfaces of said assemblies to confine the fluid under pressure to predetermined zones.

13. A wedge system for presses or the like as set forth in claim 12 wherein central openings are provided through said assemblies and said wedge to receive an ajector pin or the like, and said seal means prevents fluid under pressure from reaching said openings.

14. A wedge system for presses or the like as set forth in claim 13 wherein said seal means includes concentric spaced seals along each wedge surface and said zones are between said seals.

15. A wedge system for presses or the like as set forth in claim 14 wherein a cross passage is formed in waid wedge to connect said zones.

16. A wedge system for presses or the like as set forth in claim 15 wherein said assemblies cooperate to enclose said wedge and prevent foreign matter from reaching said wedge.

17. A wedge system for presses or the like as set forth in claim 16 wherein a sleeve extends along said openings between said assemblies to prevent foreign matter from reaching said wedge through said openings.

* * * * *

Disclaimer

3,889,515.—*Walter J. Grombka*, Tiffin, Ohio. WEDGING STRUCTURE FOR PRESSES OR THE LIKE. Patent dated June 17, 1975. Disclaimer filed Feb. 10, 1977, by the assignee, *The National Machinery Company*.

Hereby enters this disclaimer to claims 1, 2, 4, 5, 6 and 9 of said patent.

[*Official Gazette April 5, 1977.*]